(12) United States Patent
Chae et al.

(10) Patent No.: US 10,300,836 B2
(45) Date of Patent: May 28, 2019

(54) LIGHTING APPARATUS AND VEHICULAR LAMP COMPRISING THE SAME

(71) Applicant: LG INNOTEK CO., LTD., Seoul (KR)

(72) Inventors: Hyun Hee Chae, Seoul (KR); Kwang Ho Park, Seoul (KR); Byoung Eon Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 35 days.

(21) Appl. No.: 15/521,251

(22) PCT Filed: Oct. 20, 2015

(86) PCT No.: PCT/KR2015/011103
§ 371 (c)(1),
(2) Date: Apr. 21, 2017

(87) PCT Pub. No.: WO2016/064174
PCT Pub. Date: Apr. 28, 2016

(65) Prior Publication Data
US 2018/0326895 A1  Nov. 15, 2018

(30) Foreign Application Priority Data

Oct. 22, 2014 (KR) .......................... 10-2014-0143430

(51) Int. Cl.
*B60Q 1/00* (2006.01)
*B60Q 1/02* (2006.01)
(Continued)

(52) U.S. Cl.
CPC ................. *B60Q 1/02* (2013.01); *B60Q 1/00* (2013.01); *F21S 43/00* (2018.01); *F21S 43/14* (2018.01);
(Continued)

(58) Field of Classification Search
CPC .. F21S 41/24; F21S 41/30; F21S 41/37; F21S 41/40
(Continued)

(56) References Cited

U.S. PATENT DOCUMENTS

2005/0286008 A1* 12/2005 Miyagawa ............ G06F 1/1601
349/158
2008/0049446 A1  2/2008 Harbers et al.
(Continued)

FOREIGN PATENT DOCUMENTS

CN         201851960 U    6/2011
EP         2 679 886      1/2014
(Continued)

OTHER PUBLICATIONS

International Search Report (with English Translation) and Written Opinion dated Mar. 10, 2016 issued in Application No. PCT/KR2015/011103.
(Continued)

*Primary Examiner* — Thuy V Tran
(74) *Attorney, Agent, or Firm* — Ked & Associates, LLP

(57) ABSTRACT

In the present invention, there is provided a lighting device including: a light source module including at least one light source and a light guide member that buries the light source; a shielding module accommodating the light source module therein, the shielding module having an opening region and a shielding region, which are provided above the light guide member; and a diffusion member disposed in the light guide member.

19 Claims, 2 Drawing Sheets

(51) Int. Cl.
*F21V 8/00* (2006.01)
*F21S 43/00* (2018.01)
*F21S 43/14* (2018.01)
*F21S 43/239* (2018.01)
*F21S 43/245* (2018.01)
*F21S 43/249* (2018.01)
*F21S 43/30* (2018.01)
*F21S 43/40* (2018.01)
*F21S 41/40* (2018.01)
*F21S 41/30* (2018.01)
*F21S 41/37* (2018.01)
*F21S 41/24* (2018.01)

(52) U.S. Cl.
CPC ........... *F21S 43/239* (2018.01); *F21S 43/245* (2018.01); *F21S 43/249* (2018.01); *F21S 43/30* (2018.01); *F21S 43/40* (2018.01); *G02B 6/0021* (2013.01); *G02B 6/0025* (2013.01); *G02B 6/0028* (2013.01); *G02B 6/0041* (2013.01); *G02B 6/0051* (2013.01); *G02B 6/0055* (2013.01); *G02B 6/0076* (2013.01); *F21S 41/24* (2018.01); *F21S 41/30* (2018.01); *F21S 41/37* (2018.01); *F21S 41/40* (2018.01); *G02B 6/0065* (2013.01); *G02B 6/0068* (2013.01); *G02B 6/0091* (2013.01)

(58) Field of Classification Search
USPC ......................................................... 362/507
See application file for complete search history.

(56) References Cited

U.S. PATENT DOCUMENTS

| | | |
|---|---|---|
| 2011/0051411 A1 | 3/2011 | Kim et al. |
| 2012/0242930 A1 | 9/2012 | Ryu et al. |
| 2013/0075692 A1 | 3/2013 | Naasani et al. |
| 2013/0235577 A1* | 9/2013 | Park ................... G02B 6/0035 362/235 |
| 2014/0001501 A1 | 1/2014 | Park et al. |
| 2014/0001506 A1 | 1/2014 | Park et al. |
| 2014/0198531 A1 | 7/2014 | Iwasaki |
| 2015/0227003 A1 | 8/2015 | Ninan |
| 2015/0355505 A1 | 12/2015 | Overes et al. |

FOREIGN PATENT DOCUMENTS

| | | |
|---|---|---|
| EP | 2 758 336 | 7/2014 |
| EP | 2 812 752 | 12/2014 |
| JP | 2010-064684 | 3/2010 |
| JP | 2013-073732 | 4/2013 |
| JP | 5507577 | 5/2014 |
| KR | 10-2012-0108558 | 10/2012 |
| KR | 10-2014-0001510 | 1/2014 |
| KR | 10-2014-0078373 | 6/2014 |
| KR | 10-2014-0078477 | 6/2014 |
| KR | 10-2015-0048354 | 5/2015 |
| WO | WO 2014/033686 | 3/2014 |

OTHER PUBLICATIONS

European Search Report dated Oct. 30, 2017 issued in Application No. 15853404.0.

* cited by examiner

LIGHTING APPARATUS AND VEHICULAR LAMP COMPRISING THE SAME

CROSS-REFERENCE TO RELATED PATENT APPLICATIONS

This application is a U.S. National Stage Application under 35 U.S.C. § 371 of PCT Application No. PCT/KR2015/011103, filed Oct. 20, 2015, which claims priority to Korean Patent Application No. 10-2014-0143430, filed Oct. 22, 2014, whose entire disclosures are hereby incorporated by reference.

TECHNICAL FIELD

The present invention relates to a lighting device and a vehicle lamp including the same.

BACKGROUND ART

A lighting unit in which various light sources used in electronic devices are utilized has been implemented in such a manner as to increase light efficiency by utilizing an appropriate light source according to each property of the electronic devices.

The lighting unit used in the electronic devices has recently been variously applied to a backlight unit applied to a flat display, an indoor light used in indoor environments, a headlight, a fog light, a backlight, a sidelight, a license plate light, a taillight, a stop light, a turn signal light, and a hazard flasher lamp, which are installed at the outside of a vehicle, an indoor illumination lamp installed inside a vehicle, and the like.

Most of such lighting units are mainly realized by a method of increasing luminance of a surface light source by applying a member such as a light guide plate for enabling the efficient transmission of light.

However, when the surface light source is to be mounted in various places such as a vehicle lamp, it is not easy to create a design for mounting the surface light source, and it is difficult to satisfy AMECA Standard in North America for the purpose of export overseas.

In addition, due to the limit of the lighting unit to have a certain standard and configuration, it is difficult to implement the lighting unit in a slimming structure while ensuring a desired uniformity of light in a limited place.

DISCLOSURE OF THE INVENTION

Technical Problem

Accordingly, the present invention provides a lighting device having a structure in which a diffusion member is buried in a light guide member, so that the uniformity of light can be ensured and the thickness of the entire lighting device can be decreased.

Technical Solution

In order to accomplish the above object of the disclosure, there is provided a lighting device including: a light source module including at least one light source and a light guide member that buries the light source; a shielding module accommodating the light source module therein, the shielding module having an opening region and a shielding region, which are provided above the light guide member; and a diffusion member disposed in the light guide member.

Advantageous Effects

According to the present invention, the lighting device has a structure in which the diffusion member is buried in the light guide member, so that the uniformity of light can be ensured and the thickness of the entire lighting device can be decreased.

Also, when the lighting device is applied to a vehicle lamp, the vehicle lamp can be implemented as a vehicle lamp that can satisfy AMECA Standard in North America, create various designs, and have a sliming structure.

Further, the shielding module having a bracket structure, which supports the light source module, is formed in a structure shielding one region above the light source module, and enables light emitted from the light source to be reflected from a shielding region and condensed into the diffusion member, thereby increasing the light intensity and luminance of a light emitting part.

In particular, the shielding module is implemented in a structure having a bending part formed by bending an upper end of the shielding module, and luminance can be adjusted based on a bending angle of the bending part.

In addition, a lens member is provided between the shielding module and the light guide member, so that it is possible to ensure variety in design of the lighting device and to simultaneously enhance light efficiency through a non-air-gap structure in which spacing parts between components are removed.

MODE FOR CARRYING OUT THE INVENTION

Figure 1:
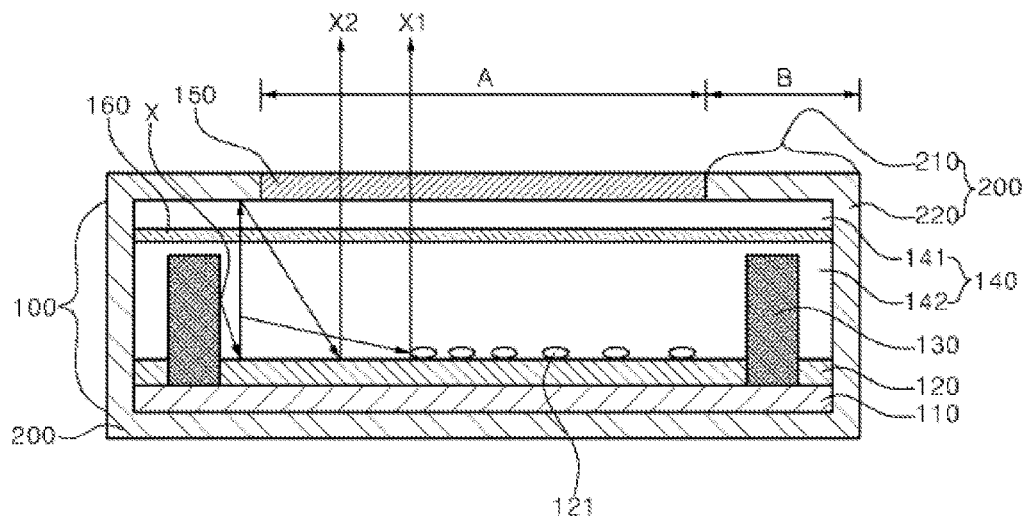
FIG. 1 is a sectional conceptual view showing main parts of a lighting device according to an embodiment of the present invention.

Hereinafter, constitutions and operations according to the present invention will be described in detail with reference to the accompanying drawings. Like reference numerals denote like elements, and a repeated description will be omitted. It will be understood that, although the terms "first," "second," and the like may be used herein to describe various elements, these elements should not be limited by these terms. These terms are only used to distinguish one element from another.

FIG. 1 is a sectional conceptual view showing main parts of a lighting device according to an embodiment of the present invention.

Referring to FIG. 1, the lighting device according to the embodiment of the present disclosure may include a light source module 100 including at least one light source 130 and a light guide member 140 burying the light source 130, a shielding module 200 accommodating the light source module 100 therein, the shielding module 200 having an opening region A and a shielding region B, which are provided above the light guide member 140, and a diffusion member 160 disposed in the light guide member 140.

In particular, the lighting device has a structure in which the diffusion member 160 is buried in the light guide member 140, so that the thickness of the entire lighting device can be decreased. More specifically, the diffusion member 160 is disposed to be spaced apart from the light source 130, and may be disposed to vertically divide the light guide member 140.

The diffusion member 160 may be implemented in a structure in which a diffusion material formed in a sheet or film shape is disposed on an upper surface of the light guide member made of resin, and the resin is again coated on the diffusion material to be cured. As the lighting device has a structure in which the diffusion member 160 is buried in the light guide member 140 as described above, the uniformity of light can be ensured by promoting the diffusion effect of light, and simultaneously, the thickness of the entire lighting device can be decreased by removing an unnecessary distance of the entire lighting device. Thus, in the structure of this embodiment, materials that form the light guide member 140 in contact with upper and lower surfaces of the diffusion member 160 can be configured as the same material. Further, the surface of the diffusion member 160 and the upper surface of the light guide member 140 are disposed in parallel to each other, so that a uniform light diffusion effect can be realized.

In addition, the lighting device according to the embodiment of the present invention can provide a structure in which the shielding module 200 having the opening region A and the shielding region B is used as a shielding bracket structure, so that a light emitting unit is not seen in non-lighting and light emission to the outside is blocked, thereby improving luminance. The lighting device has a structure in which the diffusion member 160 is buried in the light guide member 140, so that the thickness of the entire lighting device can be decreased. As the light guide member 140 is adhered closely to the shielding module 200, a spacing part between the shielding module 200 and the light guide member 140 disposed thereunder is removed, so that light efficiency can be increased.

To this end, the light source module 100 according to the embodiment of the present invention is formed in a structure accommodated in the shielding module 200. The shielding module 200, as shown in FIG. 1, may include a shielding body 220 surrounding lower and side surfaces of the light source module 100, the shielding body 220 having an opened upper portion, and a bending part forming the shielding region B as an upper end of the shielding body 220 is bent toward the center of the light source module 100.

Figure 2:
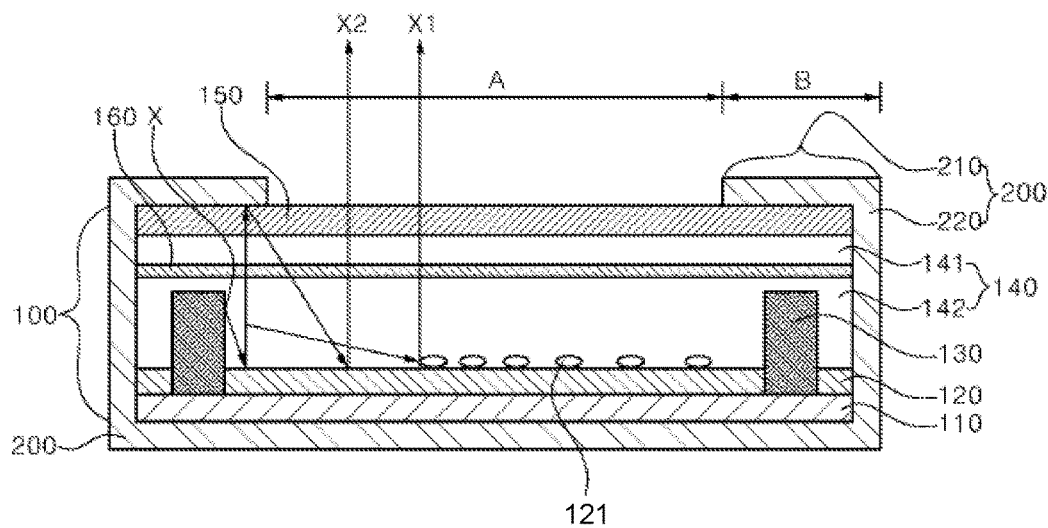
FIGS. 2 and 3 are sectional conceptual views showing main parts of lighting devices according to other embodiments of the present invention.

In the structure of FIG. 1, a structure in which a lens member 150 such as an inner lens is disposed at the upper portion of the opening region A is described as an example, but the present invention is not limited thereto. The structure may be modified as an example in which the lens member 150 is adhered closely to a lower surface of the bending part 210 as shown in FIG. 2. The structure described in FIG. 2 is characterized in that the bending part 210 performs a function of fixing the entire light source module 100, thereby implementing a more stable device structure.

In particular, the bending part 210 may be formed above a region in which the light source 130 is disposed, and have a length equal to or greater than the boundary of a light emission surface of the light source 130. That is, the bending part 210 may be formed longer toward the center of the light source module 100 than the position at which the light source 130 is mounted. More specifically, the bending part 210 may be formed longer than a distance from a side end portion of the light guide member 140 to cover an upper portion of the light source 130. Accordingly, a hot spot generated at the upper portion of the light source 130 is covered by the bending part 210, thereby improving visibility and reliability.

For example, when light emitted from the light source 130 is emitted forward via the light guide member 140, the shielding module 200 according to the embodiment of the present invention allows the light to be reflected from the bending part 210 disposed above the light source 130 and then again reflected from a reflection member 120 or the like, which is disposed at a lower portion of the light guide member 140, so that the efficiency and concentration of light can be enhanced.

That is, when a side view type LED is used as the light source 130 applied to the lighting device according to the embodiment of the present invention, light X1 emitted from a light emission surface X may have a route along which the light X1 directly advances through the opening region A via the inside of the light guide member 140. However, light reflected at the inside of the light guide member 140 or emitted from the light emission surface X may be again reflected from an inner surface of the bending part 210 and then advance through the opening region A. Thus, the concentration and efficiency of light can be enhanced.

That is, the shielding module 200 according to the present invention has a function of blocking light emission to the outside by surrounding lower and side surfaces of the lighting device, and simultaneously, is formed in an upper region of the light source 130, so that light emitted as indicated as an arrow in FIG. 1 is blocked not to be emitted to the outside and is reflected toward the inside of the lighting device, thereby improving light efficiency. The shielding module 200 may include any one of aluminum (Al), polycarbonate (PC), polypropylene (PP), acrylonitrile-butadiene-styrene resin (ABS), and polybutyrene terephthalate resin (PBT). However, the present invention is not necessarily limited thereto, and all materials that enable light to be blocked and reflected may be used. At this time, if the shielding module 200 is deposited using Al, the shielding module 200 has an effect such as a mirror in non-lighting of the light source. In addition, the bending part 210 formed above the light source 130 in the light shielding module 200 may be fixed to a side surface of the shielding body 220 in the vertical direction as shown in the drawing, but be controlled to a predetermined angle. In this case, luminance may be controlled according to an angle of the bending part 210. In addition, as the light source 130 and the shielding module 200 are configured as one set, the durability and assembling efficiency of the lighting device can be improved, and an advantageous effect can be obtained in design of the lighting device.

Figure 3:
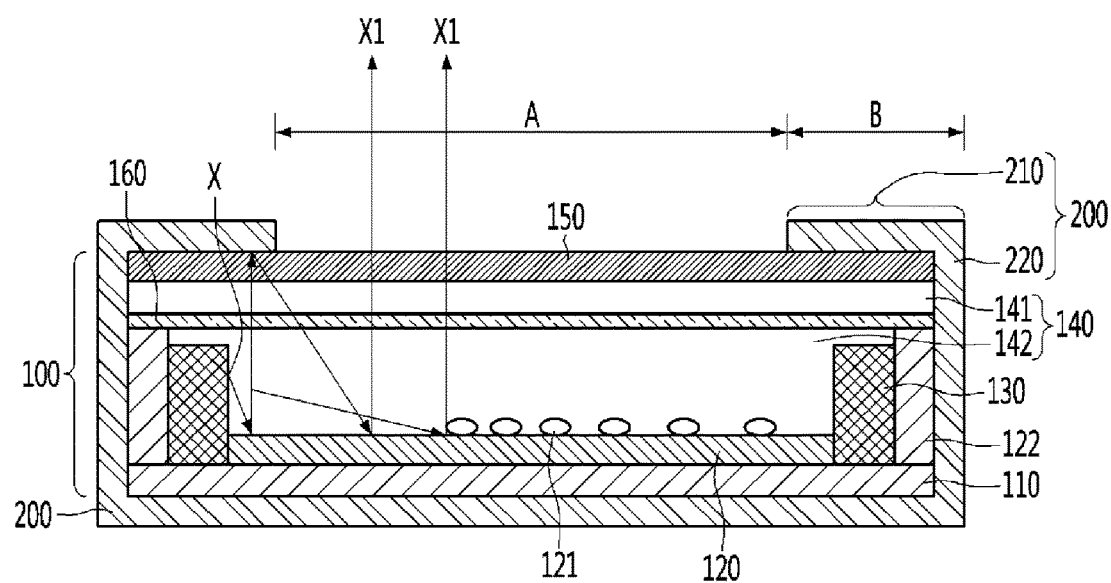

FIG. 3 illustrates another embodiment of the lighting device according to the embodiment of the present invention.

The structure of FIG. 3 is different from that of FIG. 2 in that, in the light source module 100 including a printed circuit board 110 having the light source 130 mounted thereon and the light guide member 140, a reflection member 122 (hereinafter, referred to as a 'side reflection member') is further formed at a side portion of the light guide member 140. In the embodiments of FIGS. 1 and 2, it is illustrated that the shielding module 200 itself is implemented as a reflection member. However, in this embodiment, the side reflection member 122 is disposed using a separate member, so that light can be again reflected at the side portion of the light guide member 140. In this case, the side reflection member 122 may be implemented integrally with or separately from the reflection member 120 disposed on an upper surface of the printed circuit board 110, using the same material. However, the side reflection member 122 may be implemented using another material.

In particular, even in the structure of FIG. 3, the lens member 150 is disposed on the light guide member 140, and both of the lens member 150 and the light guide member 140 are accommodated in the shielding module 200. That is, in the relation of the lens member 150 with the light guide member 140 disposed thereunder, the lens member 150 may be formed in a structure having no spacing part (hereinafter, referred to as a 'non-air-gap structure').

In other words, the diffusion member 160 according to the present invention is preferably adhered closely to the light guide member 140 such that no spacing part is formed between the diffusion member 160 and the light guide member 140. In a general lighting device that realizes surface emission, a diffusion member is frequently formed on a member such as a light guide plate. In this case, a spacing part for realizing surface emission is necessarily required to be about 10 mm. Therefore, the light efficiency of the light device is decreased, and it is difficult to design the lighting device. However, in the embodiment of the present invention, the diffusion member 160 is buried in the light guide member 140, and the non-air-gap structure in which a separate spacing part is removed in the shielding module 200 is implemented when a lens member is additionally required or in the structure shown in FIG. 1, so that the above-described problem can be eliminated. Accordingly, efficient light diffusion can be realized, and light efficiency can be improved.

In FIGS. 1 to 3, the diffusion member 160 functions to uniformly diffuse light emitted by passing through the light guide member 140 throughout the entire surface. The diffusion member 160 may be generally formed of acrylic resin, but the present invention is not limited thereto. In addition, the diffusion member 160 may be made of all materials capable of performing a diffusing function, such as polymethyl methacrylate (PMMA), polystyrene (PS), cyclic olefin polymer (COC), polyethylene terephthalate (PET), and high permeable plastic such as resin.

In the lighting device according to the present invention, the light source module 100 may basically include the printed circuit board having the light source 130 mounted thereon. In this case, the printed circuit board 110 refers to a board in which a circuit pattern is formed on a substrate, i.e., PCB. In the present invention, the printed circuit board 110 is preferably made of a transparent material. In the case of a conventional lighting device, an FR4 printed circuit board is used, which is opaque. However, in the present invention, a printed circuit board made of a transparent material, particularly, a transparent PET printed circuit board is used, so that it is possible to provide a transparent lighting device. Also, in the present invention, the printed circuit board 110 may be formed as a flexible printed circuit board (FPCB) so as to ensure a certain flexibility.

The light source 130 constituting the light source module 100 is a part that emits light as one or more light sources are arranged on the printed circuit board 110. The light source 130 of the present invention may be configured as a side view type light emitting diode. That is, a light emitting diode having a structure in which light emitted therefrom does not advance immediately upwards but is emitted toward a side surface thereof may be used as the light source 130 of the present invention. Accordingly, in the lighting device of the present invention, the light source 130 configured as the side view type light emitting diode is disposed in an upright type. Hence, light is diffused and guided in the upper direction, using a resin layer for implementing a light diffusion and reflection function, which will be described below. Thus, the total number of light sources can be decreased, and the entire weight and thickness of the lighting device can be remarkably reduced.

In addition, the light guide member 140 disposed on the printed circuit board 110 is provided above the printed circuit board 110 to diffuse and guide light emitted from the light source 130. The light guide member 140 may be not only a conventional light guide plate but also a resin layer substituting for the light guide plate.

In addition, the reflection member 120 may be further provided between the printed circuit board 110 and the light guide member 140. In this case, the reflection member 120 is formed on the upper surface of the printed circuit board 110, and has a structure in which the light source 130 is formed to pass therethrough. The reflection member 120 is formed of a material having high reflection efficiency to reflect light emitted from the light source to an upper portion at which the diffusion member 160 is located, thereby reducing light loss. The reflection member 120 may be formed in a film shape, and include a synthetic resin that spread-contains white pigment so as to implement the natures helping promote the reflection and diffusion of light. For example, the white pigment may include titanium dioxide, aluminum oxide, zinc oxide, carbonate, barium sulfate, calcium carbonate, etc., and the synthetic resin may include polyethylene terephthalate, polyethylene, naphthalate, acrylic resin, polycarbonate, polystyrene, polyolefin, cellulose acetate, weatherproof vinyl chloride, etc. However, the present invention is not limited thereto.

A reflection pattern 121 may be formed on a surface of the reflection member 120. The reflection pattern 121 functions to scatter and disperse incident light such that the light is uniformly transmitted to the diffusion member 160. The reflection pattern 121 may be formed by performing printing on the surface of the reflection member 120 using a reflection ink that contains any one of $TiO_2$, $CaCO_3$, $BaSO_4$, $Al_2O_3$, Silicon, PS, and the like, but the present invention is not limited thereto. In addition, instead of a film, transparent PET may be used as the reflection member 120.

The reflection pattern 121 is formed in a structure including a plurality of protruding patterns. In order to enhance the reflection and diffusion effects of light, the reflection pattern 121 may be formed in a dot pattern shape, a prism shape, a lenticular shape, a lens shape, or a combination thereof, but the present invention is not limited thereto. In addition, a section of the reflection pattern 121 may be formed in various shapes such as a triangle shape, a quadrangle shape, a semi-circular shape, a sine wave shape, and the like.

Further, the reflection pattern 121 may be formed to include the patterns having the same size or different sizes, and the arrangement density of the patterns may also be adjusted. That is, the arrangement density is controlled such that, as each pattern is more distant from the light source 130, the size of the pattern becomes larger, or the distance between the patterns becomes narrower, thereby forming a high pattern density. Thus, the uniformity of light can be ensured by increasing light reflectance when the pattern is distant from the light source 130.

A resin layer may be applied as the light guide member 140 according to the present invention. In this case, the resin layer is coated to be adhered closely to the entire surface of the light source 130, thereby burying the light source 130.

When the light guide member 140 is formed as the resin layer, the resin layer diffuses and guides the light emitted from the light source 130 forward. That is, the resin layer is formed to bury the light source 130, thereby functioning to disperse the light emitted from the light source 130 to a lateral direction. That is, the resin layer can perform the function of the conventional light guide plate.

The resin layer of the present invention may be made of a resin material capable of basically diffusing light. For example, the resin layer of the present invention may be made of an ultraviolet curing resin containing an oligomer. More specifically, the resin layer may be made of a resin containing a urethane acrylate oligomer as a main raw material. For example, a resin in which the urethane acrylate oligomer corresponding to a synthetic oligomer and a polyacrylic polymer are mixed together may be used. It will be apparent that the resin layer may further include a monomer corresponding to a low boiling point and diluted type reactive monomer in which isobornyl acrylate (IBOA), hydroxylpropyl acrylate (HPA), 2-hydroxyethyl acrylate (2-HEA), and the like are mixed. Also, a photo initiator (e.g., 1-hydroxycyclohexyl phenyl-ketone and the like), an antioxidant, or the like may be further mixed as an additive. However, the foregoing is only one example, and in addition to these materials, the resin layer may be formed using all resin materials capable of performing a light diffusing function, which have been developed and commercialized or can be implemented according to technical development in the future.

Meanwhile, the resin layer of the present invention may further include a form in which a plurality of beads in which pores (or air gaps) are formed may be mixed and diffused. The light beads function to increase a light reflecting and diffusing property. For example, when light emitted from the light source 130 is incident onto the beads inside the resin layer, the light is reflected and transmitted by the pores of the beads. Thus the light is diffused and condensed, and is then emitted upwards. At this time, the reflectance and diffusion coefficient of the light is increased by the beads, so that the uniformity and amount of the emitted light can be increased. As a result, the luminance of the lighting device can be improved.

A content of the beads may be appropriately adjusted to obtain a desired light diffusing effect. More specifically, the content of the beads may be adjusted within a range of 0.01% to 0.3% compared to a total weight of the resin layer, but the present invention is not limited thereto. That is, light emitted from the light source 130 in the lateral direction is diffused and reflected through the resin layer and the beads, thereby advancing upwards. The beads may be made of any one selected from among silicon, silica, glass bubble, polymethyl methacrylate (PMMA), urethane, Zn, Zr, $Al_2O_3$, and acryl, and a particle diameter of the beads may be formed in a range of 1 μm to 20 μm. However, the present invention is not limited thereto.

According to the present invention, thanks to the presence of the resin layer, a thickness occupied by the conventional light guide plate can be remarkably reduced, and thus the entire product can be implemented in a slimming structure. Furthermore, it is advantageous in that, thanks to a flexible property, a curved surface can be easily applied, the degree of freedom in a design can be improved, and the lighting device can be also applied to other flexible displays.

The lighting device according to the present invention can be applied to various lamp devices such as a vehicle lamp, a home lighting device, an industrial lighting device and the like. For example, when the lighting device is applied to the vehicle lamp, it can be also applied to a headlight, a vehicle indoor light, a door scuff, a backlight, and the like. Additionally, the lighting device according to the present invention can be applied to a backlight unit field applied to a liquid crystal display device. In addition, the lighting device according to the present invention can be also applied to all fields regarding illumination which have been developed and commercialized or may be implemented according to technical development in the future.

As previously described, in the detailed description of the present invention, having described the detailed exemplary embodiments of the invention, it should be apparent that modifications and variations can be made by persons skilled without deviating from the spirit or scope of the present invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

The invention claimed is:

1. A lighting device comprising:
   a light source module including at least one light source disposed on a printed circuit board and a light guide member in which the light source is buried;
   a diffusion member disposed in the light guide member;
   a shielding module accommodating the light source module therein; and
   a reflection member disposed on the printed circuit board,
   wherein the reflection member includes a side reflection member disposed between the at least light source and an inner side surface of the shielding module, and
   wherein the light guide member that is in contact with upper and lower portions of the diffusion member is made of the same material.

2. The lighting device of claim 1, wherein the diffusion member is spaced apart from the light source.

3. The lighting device of claim 2, wherein the diffusion member is disposed parallel to an upper surface of the light guide member.

4. The lighting device of claim 2, wherein the light guide member is in direct contact with the light source.

5. The lighting device of claim 4, wherein the light guide member includes a resin in which a urethane acrylate oligomer corresponding to a synthetic oligomer and a polyacrylic polymer are mixed together.

6. The lighting device of claim 2, wherein the shielding module includes an opening region provided in an upper direction of the light guide member, and a shielding region that extends from the opening region.

7. The lighting device of claim 6, wherein the shielding module includes:
   a shielding body surrounding lower and side surfaces of the light source module, the shielding body having the opening region formed by opening a partial region of an upper portion of the shielding body; and
   a bending part formed by bending one end of the upper portion of the shielding body toward a center of the light source module.

8. The lighting device of claim 7, wherein a lower surface of the bending part is in contact with an upper surface of the light guide member.

9. The lighting device of claim 7, wherein a length of the bending part is formed longer than a distance from one end of the light guide member to the light source.

10. The lighting device of claim 7, wherein the shielding module is formed of a material including any one of aluminum (Al), polycarbonate (PC), polypropylene (PP), acrylonitrile-butadiene-styrene resin (ABS), and polybutyrene terephthalate resin (PBT).

11. The lighting device of claim 7, further comprising a lens member disposed between a lower surface of the shielding body and an upper surface of the light guide member,
   wherein the lens member and the light guide member are formed in a non-air-gap structure.

12. The lighting device of claim 11, wherein a lower surface of the bending part is in direct contact with an upper surface of the lens member.

13. The lighting device of claim 11, wherein the lens member is disposed at a position corresponding to the opening region.

14. The lighting device of claim 11, wherein the lens member and the light guide member are formed in a non-air-gap structure.

15. The lighting device of claim 1, wherein the reflection member includes the side reflection member and a lateral reflection member which are made of the same material, wherein the side reflection member is disposed in the shielding module.

16. The lighting device of claim 1, wherein the side reflection member is in contact with the at least one light source.

17. The lighting device of claim 1, wherein the side reflection member is in contact with a bottom surface of the diffusion member.

18. A lighting device comprising:
   a light source module including at least one light source disposed on a printed circuit board and a light guide member in which the light source is buried;
   a diffusion member disposed in the light guide member;
   a shielding module accommodating the light source module therein; and
   a reflection member disposed on the printed circuit board,
   wherein the reflection member includes a side reflection member disposed between the at least light source and an inner side surface of the shielding module, and
   wherein the diffusion member is disposed in a structure dividing the light guide member into two in a lateral direction.

19. A vehicle lamp comprising:
   a bracket configured to form a light shield; and
   a lighting device disposed in the bracket, the lighting device including:
      a light source module disposed in the body, the light source module including at least one light source disposed on a printed circuit board and a light guide member in which the light source is buried;
      a diffusion member disposed in the light guide member; and
      a reflection member disposed on the printed circuit board,
      wherein the reflection member includes a side reflection member disposed between the at least light source and an inner side surface of the bracket, and
      wherein the light guide member that is in contact with upper and lower portions of the diffusion member is made of the same material.

* * * * *